United States Patent [19]

Schürmann

[11] Patent Number: 4,968,088
[45] Date of Patent: Nov. 6, 1990

[54] OUTWARDLY SWINGABLE ROOF ASSEMBLY FOR AUTOMOTIVE VEHICLES

[75] Inventor: Erich Schürmann, Sendenhorst, Fed. Rep. of Germany

[73] Assignee: Gabel GmbH, Schwelm, Fed. Rep. of Germany

[21] Appl. No.: 433,041

[22] Filed: Nov. 6, 1989

[30] Foreign Application Priority Data

Nov. 22, 1988 [DE] Fed. Rep. of Germany ....... 3839402

[51] Int. Cl.⁵ .......................... B60J 7/047; B60J 7/04
[52] U.S. Cl. .................................... 296/216; 296/220; 296/223; 296/224; 49/324; 49/386; 292/275; 16/200
[58] Field of Search ............... 296/216, 220, 223, 224; 49/324, 356, 381, 386; 292/275; 16/200

[56] References Cited

U.S. PATENT DOCUMENTS 966,930  8/1910  Lee, Jr. ................................ 292/275
3,306,645  2/1967  Maleck ................................ 292/275

FOREIGN PATENT DOCUMENTS 1283105  11/1968  Fed. Rep. of Germany ...... 296/219

Primary Examiner—Dennis H. Pedder
Attorney, Agent, or Firm—Herbert Dubno

[57] ABSTRACT

A roof vent, sun roof or like system has a tiltable panel which is hingedly mounted in a frame around a roof opening of an automotive vehicle. The assmebly includes a rectilinear guide along which a slider is displaceable to straighten a bent spring bar connected to the panel and thereby allow the panel to be drawn into sealing closure with the frame.

24 Claims, 8 Drawing Sheets

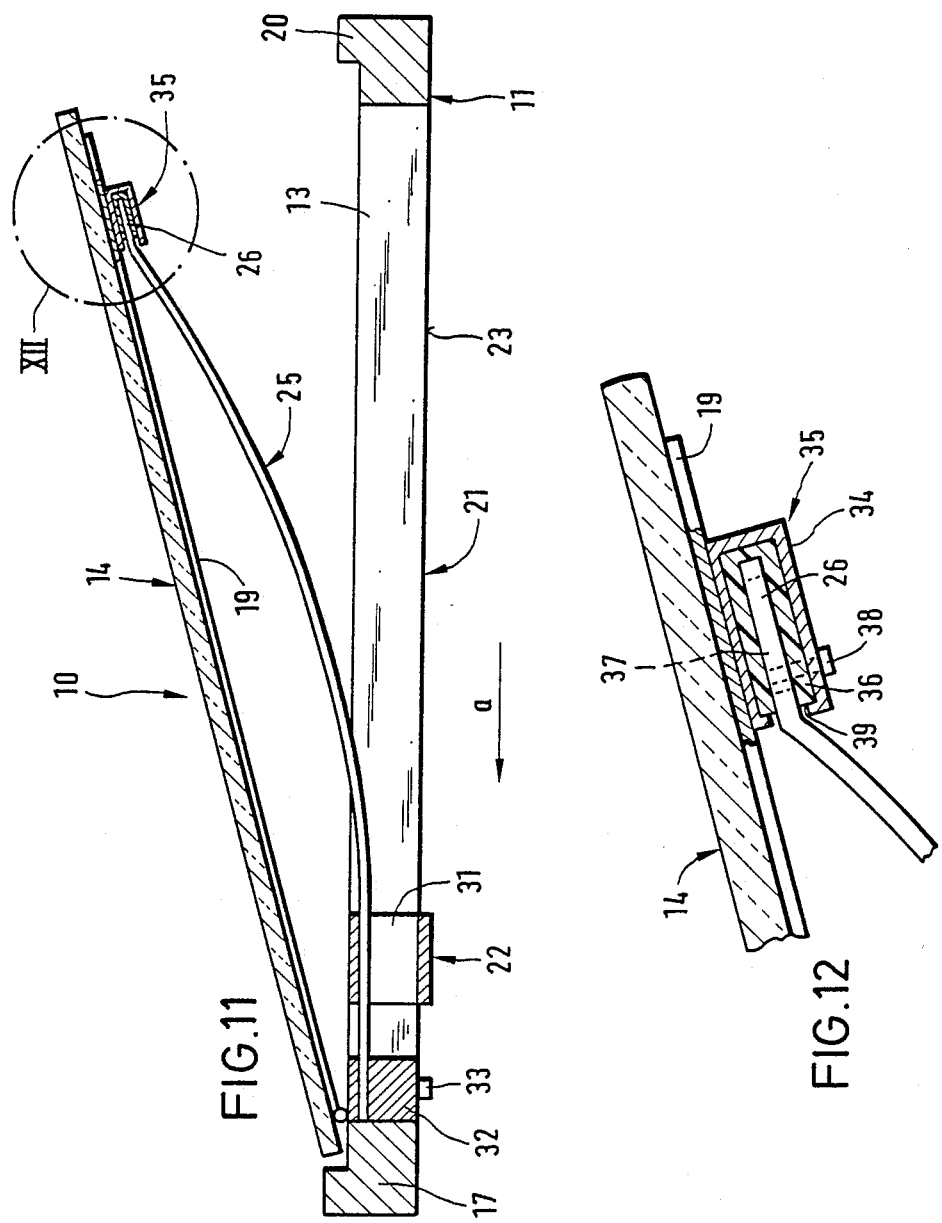

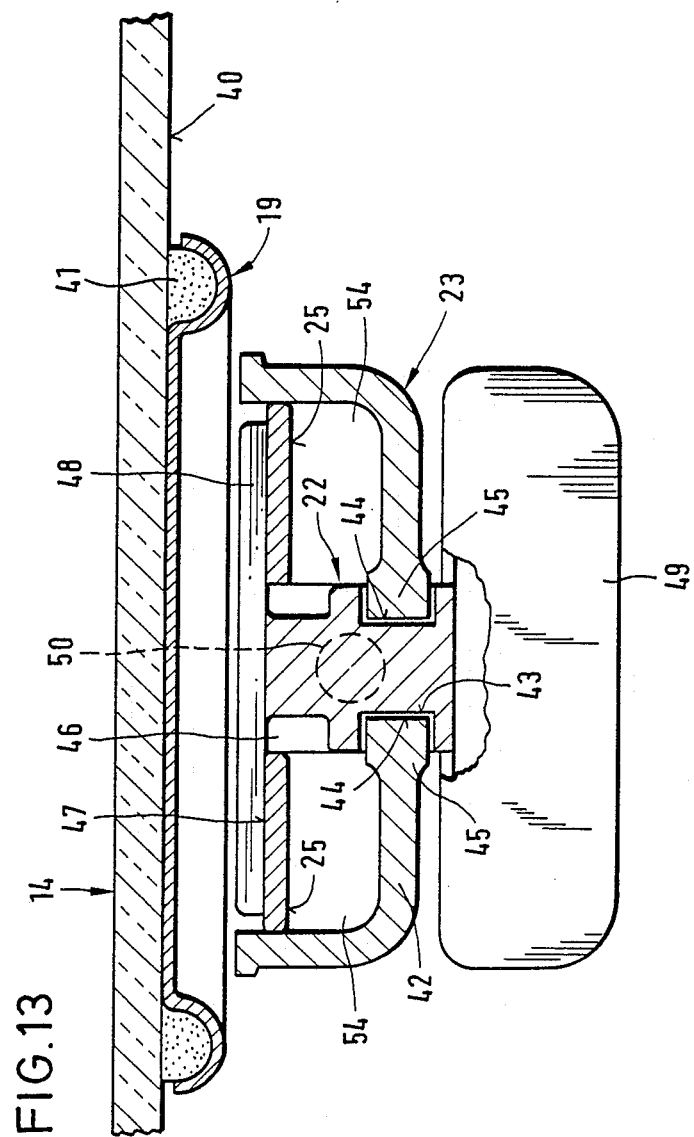

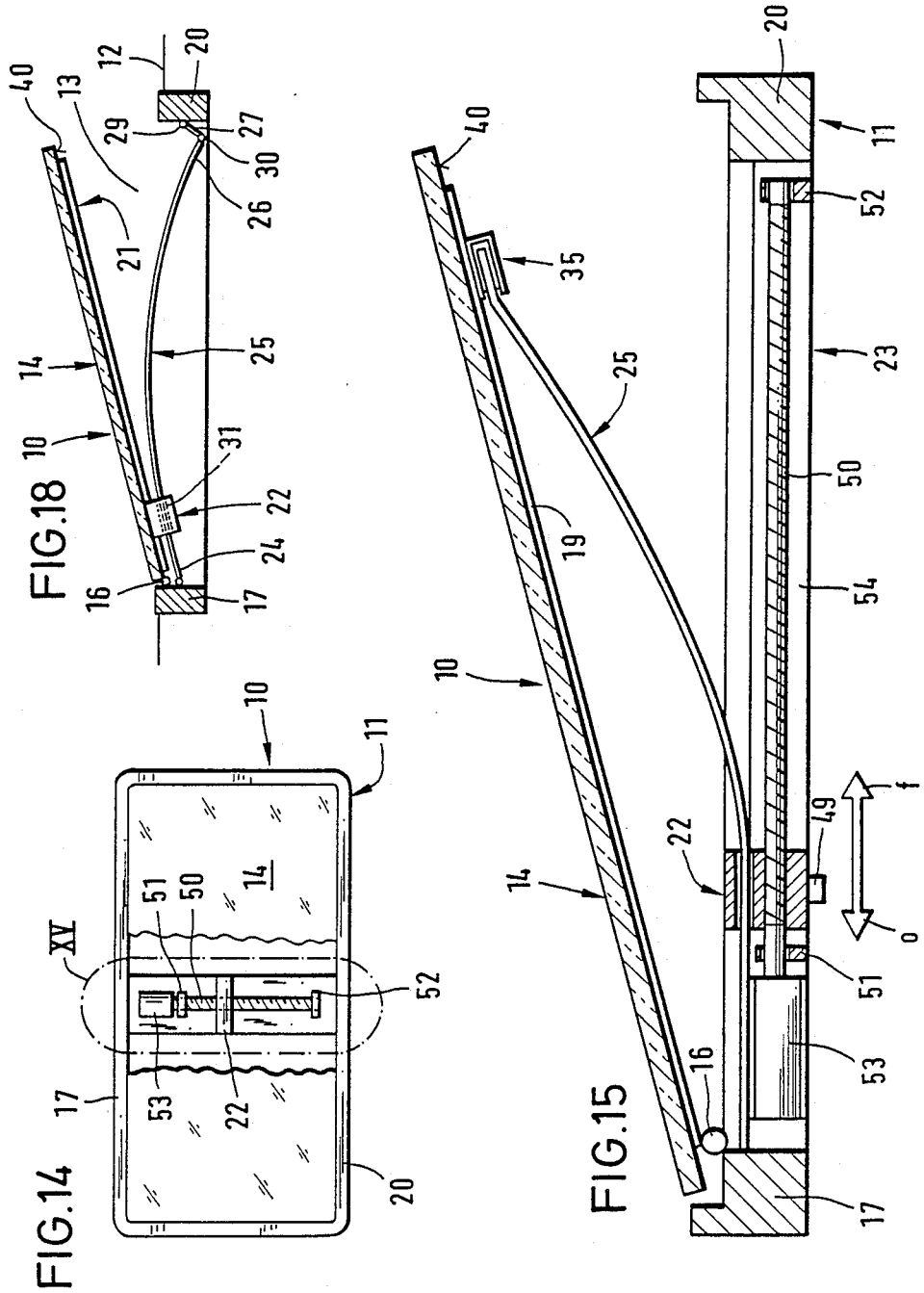

OUTWARDLY SWINGABLE ROOF ASSEMBLY FOR AUTOMOTIVE VEHICLES

CROSS REFERENCE TO RELATED APPLICATION

This application is related to the commonly assigned concurrently filed copending application Ser. No. 07/433042 based upon German patent application P 38 39 403.2 of Nov. 22, 1988.

FIELD OF THE INVENTION

My present invention relates to a roof assembly having an outwardly swingable part which can be closed onto a frame and in which the outwardly swingable panel may be translucent or transparent in the case of a sun-roof. More particularly, the invention relates to a sun-roof structure for an automotive vehicle in which the panel can be composed of glass and the panel is swingable upwardly from a closed position in which it is held within a frame, to open the assembly.

BACKGROUND OF THE INVENTION

A tiltable panel assembly of the type with which the present invention is concerned is described in European patent document EP 0 059 859. The panel in this assembly is bent into an outwardly convex shape.

In order to ensure that the panel can be drawn in a water-tight manner against the frame and can be sealed by the sealing strip around the opening in the frame and in the roof of the automotive vehicle, considerable closing force must be applied to ensure that the panel will be drawn uniformly against the seal in the frame. Indeed, the closing force in this case must be sufficient to bring about an elastic deformation of the panel.

The panel closing element in this earlier system is a toggle closure which is provided at an edge of the panel opposite an edge along which two hinges are provided The known toggle closure has two closure parts which enable a secure sealing-closure position of the panel to be achieved although at the expense of a high closing force.

The high closing force is a function of the nature of a toggle closing since the toggle closure generally has a deadpoint position which must be traversed by application of the force maximum before this force maximum displaces the closure beyond the deadpoint position. As a consequence, the force maximum can be significantly greater than the closing force required for secure closing of the panel against the frame.

OBJECTS OF THE INVENTION

It is the principal object of the present invention to provide an improved assembly for the purposes described which can provide a water-tight retention of the panel against the frame with a relatively small closing force.

Another object of the invention is to provide a roof assembly with a tiltable panel which can be operated more effectively than earlier systems.

It is also an object of the invention to provide an improved sun roof or like tiltable-panel assembly for an automotive vehicle whereby drawbacks of the earlier system are avoided.

SUMMARY OF THE INVENTION

These objects and others which will become apparent hereinafter are attained, in accordance with the present invention in a sun-roof or other tiltable-panel roof assembly for an automotive vehicle which comprises:

a frame element on a roof of an automotive vehicle defining an opening between exterior and interior of the vehicle;

a panel element mounted on the frame element and movable between an open position wherein the panel element is tilted out of the opening and a closed position wherein the panel element blocks the opening;

a hinge member in the frame element pivotally supporting the panel element to enable the panel element to swing between the positions about a pivot axis;

a rigid elongated substantially rectilinear guide mounted on one of the elements and extending substantially perpendicular to the axis;

an intrinsically bent elastically straightenable bar braced at one end, extending generally along the guide and operatively connected to the panel element; and a control member on the guide traversed by the bar and controlling shape of the bar upon relative displacement of the bar and the control member, at least one of the members being shiftable along the guide so that, upon displacement of the at least one of the members in one direction constraint on the bar is released and restoring force of the bar upon returning to a curved state displaces the panel member into the open position and, upon displacement of the at least one of the members in an opposite direction along the guide, the bar is elastically straightened by constraint applied by the control member and the panel member is displaced into the closed position.

While the toggle closure of the prior art comprises two articulated links, one articulated to the frame and the other articulated to the panel and hingedly connected to one another so as to create a deadpoint which must be overcome in displacing the panel between its locked position and its open position, the system of the invention is based upon an entirely different principle.

In the system of the invention, the closure part is a bent bar which, in its relaxed position, lies in its bent state but which can be constrained to lie in a less bent orientation One end of this bar is braced against a support at the vehicle-roof side of the bar while the other end acts upon the panel in a sense tending to open the latter.

To close the panel it suffices to deform the bent bar from its curved position, corresponding to the open panel, into a straightened or extended position. A second closure part is thus provided, in accordance with the invention, in the form of a guide as to which the bent bar is constrained by at least one member slidable along this guide.

In the most preferred embodiment of the invention, the guide is rigid and is braced between two diametrically oppositely disposed limbs of the frame.

One end of the bar is articulated in a tension-fast and compression-fast manner to the panel and urges the latter in the opening sense. However, a kinematic reversal is also possible of the preferred embodiment wherein the guide is provided on the inner surface of the panel and the slider is therefore displaced on this guide on the panel while the elastic bar is fastened between the diametrically oppositely disposed limbs of the frame.

In accordance with the invention, the closure as described provides the greatest part of the closing displacement at the beginning of the closing movement of the slider and the rate of closure with respect to the displacement of the slider increasingly diminishes with further movement of the slider so that at the end of the slider movement there is practically an insignificant displacement of the panel with further slider movement although this further movement suffices to bring about the sealing engagement of the panel with the frame with a practically zero additional closing displacement of the panel.

The result is a substantial change in the force and displacement ratios whereby initially a certain unit of displacement of the slider gives rise to a large displacement of the panel with little closing force whereas, toward the end of the stroke of the slider, with comparatively little applied force, a relatively large closing force can be generated with little displacement. The roof closure of the invention, therefore, is user-friendly and is easy to handle.

According to a further feature of the invention, the bent bar is constituted as a leaf spring which can be constituted from spring steel.

According to another feature of the invention, one end of the bar is fixed against displacement relative to the guide and means is provided to retain that one end of the bar on the guide. This means can, in turn, be displaceable along the bar and can, for example, be a bracket freely shiftable along the guide. In this case, both the bracket and the control member or slider can both be shiftable along the guide.

The bar can be articulated to the panel element at an articulation formed with a length compensation region. This articulation can include a link which is short relative to the length of the bar and can have one end connected by a hinge joint to the panel element and another end connected by a hinge joint to the bar.

According to another aspect of the invention, the length compensation region can be or can include a vibration damper. The vibration damper can be formed with an annular peripherally-closed housing opening toward the bar and filled with a permanently-elastic synthetic resin with a pasty consistency into which the other end of the bar extends as a plunger and surrounding the other end of the bar in the housing. The vibration damper can be provided with means for preventing withdrawal of the other end of the bar from the housing.

As noted, the control member is advantageously a slider mounted on the guide and the bar is received in a sliding channel formed in the slider. In this context, the assembly can also include a motor operatively connected to the slider for displacing the slider along the guide. The motor can be mounted along the guide and can have a threaded spindle extending along the guide traversing the slider and rotated by the motor. The slider is then formed or has a nut threadedly engaging the spindle and displaced thereby along the guide.

Where the bracket is provided to retain the one end of the bar, the spindle can pass through a smooth bore in the bracket without entraining same.

BRIEF DESCRIPTION OF THE DRAWING

The above and other objects, features and advantages of the present invention will become more readily apparent from the following description, reference being made to the accompanying drawing in which:

FIG. 11 is a view corresponding to FIG. 9 of a modification of that embodiment drawn to a larger scale;

FIG. 12 is a detail view of the compensation unit of the embodiment of FIG. 11 corresponding to the region XII thereof;

FIG. 13 is a cross-sectional view taken along the line XIII—XIII of FIG. 7;

FIG. 14 is a diagrammatic plan view showing a motor-driven tiltable roof assembly of the invention;

FIG. 15 is a cross-sectional view through the detail XV of FIG. 14;

FIG. 18 is a cross-sectional view of an embodiment of the invention which is a kinematic reversal of the embodiment of FIG. 4.

SPECIFIC DESCRIPTION

Figure 1:
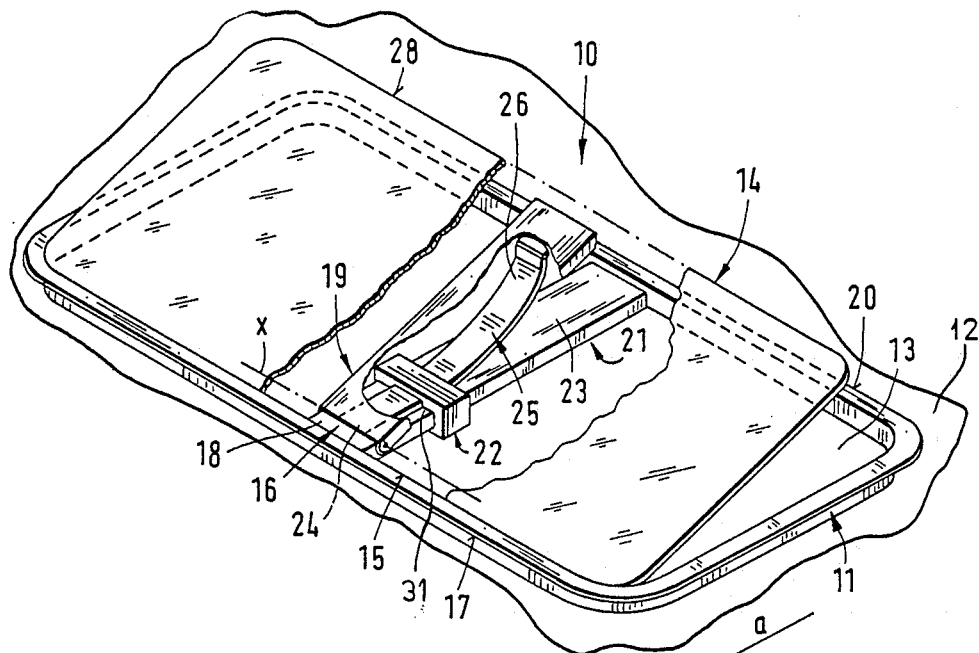
FIG. 1 is a schematic perspective view illustrating the roof assembly with the outwardly tiltable glass panel and showing the surrounding portions of the roof of the vehicle only diagrammatically, the strip attached to the panel and concealing the bent bar being partly broken away.

In the drawing, the assemblies having panels which are tiltable out of the frame openings have all been indicated by the reference numeral 10. The assembly 10 is lodged in the roof of an automotive vehicle represented at 12.

Each assembly comprises a one-piece or multipartite frame 11 received in the roof 12 and defining an opening 13.

The opening 13 can be closed by a roof panel 14 or can be opened to allow communication between the exterior and the interior of the vehicle when the panel 14 is tilted upwardly. The panel 14 is preferably a translucent or transparent pane, e.g. of glass.

The direction of travel of the vehicle has been represented by the arrow a. At the leading edge 15 of the panel 14, the panel in the embodiment of FIG. is connected by a hinge 16 to the front limb 17 of the frame in a swingable manner. For this purpose, the front limb 17 of the frame is provided with a hinge bracket 18 forming one part of the hinge while the other part of the hinge is formed from the front region of a flat strip 19 bonded to the inner surface of the panel 14, e.g. by an adhesive layer.

The strip 19 has a U-section or channel-shaped opening away from the inner surface 40 of the panel. The strip 9 can be attached to the inner surface 40 alternatively by a welding operation, in the case in which the panel is composed of a plastic, or by a screw connection. The pivot axis of the hinge 16 has been represented at x in FIG. 1.

Between the front limb 17 and the rear limb 20 of the frame, within the opening 13, a guide 21, e.g. a rail, is mounted. The guide 21 receives a slider 22 through which the strut 23 forming the guide 21 extends.

Above the connecting strut and at the front end of the latter, a front end 24 of a bent bar 25, e.g. a leaf spring, is anchored. This bar has a bent configuration in its relaxed state.

The rear end 26 or articulated end of leaf spring 25 is connected by means of a relatively short link 27 articulately to the panel 14 in the region of the rear panel edge 28 in a substantially tension-fast and compression-fast manner. The link 27 is connected by a pivot joint 29 to the inner surface 40 of the panel 14 and by a pivot joint 30 at its opposite end with the rear end 26 of the leaf spring 25.

Figure 4:
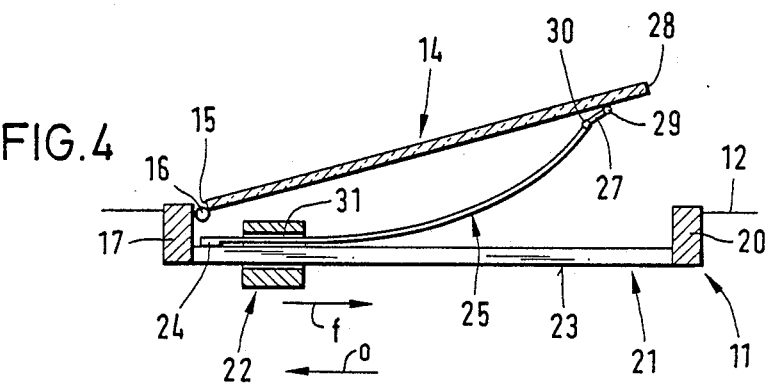
FIG. 4 is a view similar to FIG. 2 showing the panel in its maximally open position.
Figure 5:
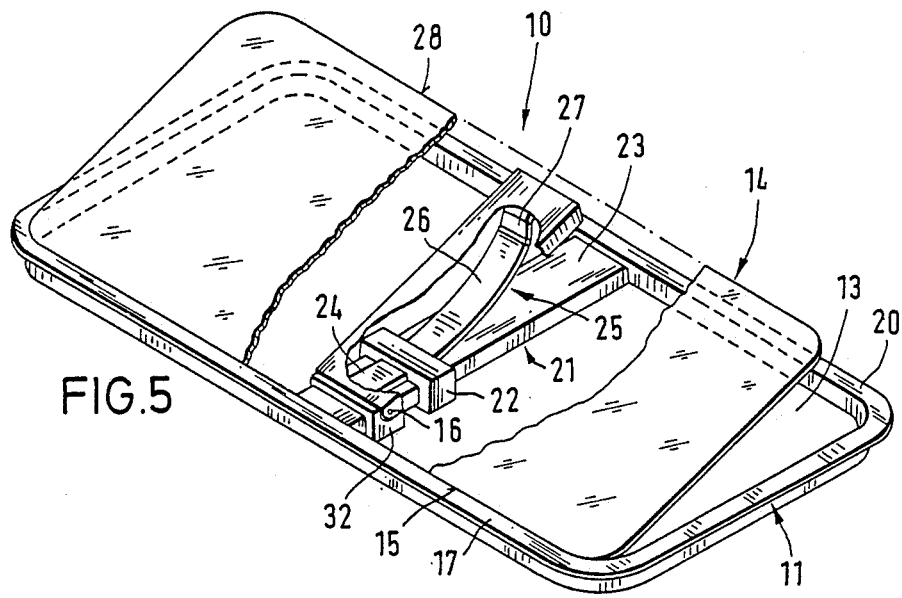
FIG. 5 is a view generally similar to FIG. 1 of an embodiment of the invention in which the assembly is partly open as in FIG. 1 but the panel otherwise unshifted.
Figure 6:
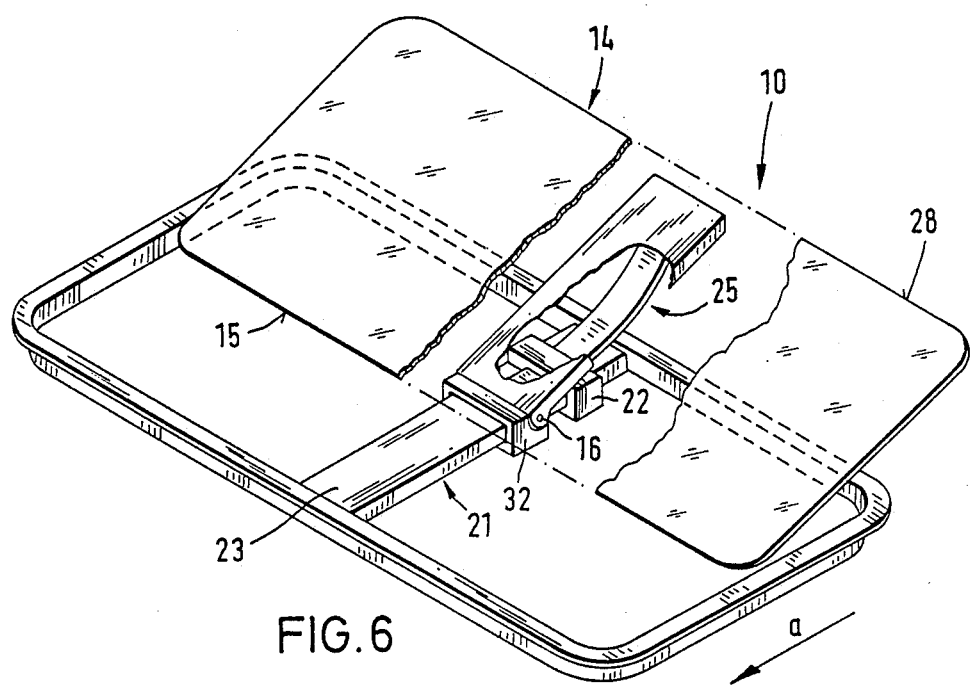
FIG. 6 is a view similar to FIG. 5 showing a shifted position of the panel.
Figure 7:
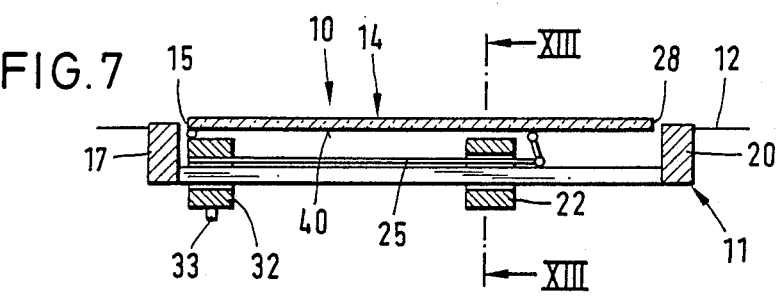
FIGS. 7-10 are diagrammatic cross-sectional views through the embodiment of FIGS. 5 and 6 and similar to FIGS. 2-4 showing the panel in its closed position (FIG. 7), the panel in an intermediate open position (FIG. 8), the panel in a fully open position but unshifted (FIG. 9) and the panel in a shifted position (FIG. 10).
Figure 8:
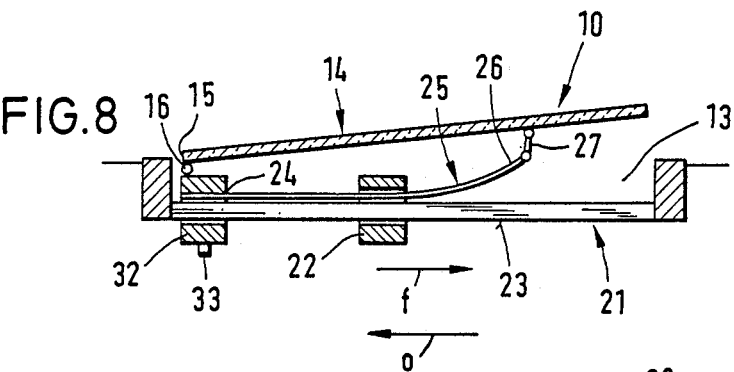

As can be especially determined from FIGS. 1 and 4, the relieved curved leaf spring 25, braced at 24 against movement and engaging the disk 14 at 26, holds the panel in its open position.

Within a guide slot 31 above the connecting strut 23, a movable slider 22 or control member is displaceable in translation on the connecting strut 23 and is traversed by the elastic bar or leaf spring 25.

When the slider 22 is manually shifted in the direction f (FIG. 3), the leaf spring 25 is increasingly constrained to approach the connecting strut 23 over an increasing portion of the length thereof, thereby straightening the leaf spring 25 (FIG. 2) and drawing the panel 14 into its closed position. The opening movement of the panel is effected by displacing the slider 22 oppositely in the direction o. As a matter of completeness, I can observe that the frame and the panel can be provided with seals which bridge the gaps between the frame and the panel in the closed position and which have not been illustrated in the drawing.

Figure 2:
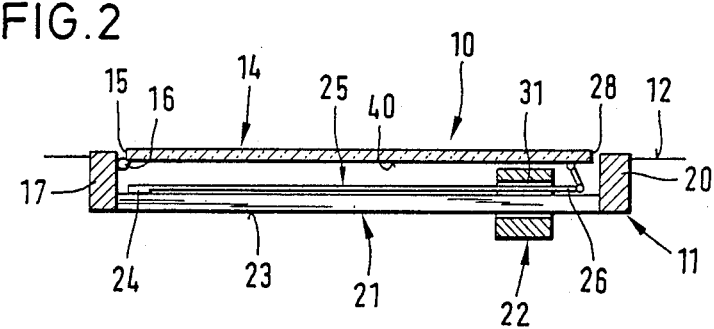
FIG. 2 is a cross-sectional view in highly diagrammatic form taken generally in a plane parallel to the guide and illustrating the assembly in a closed state.
Figure 3:
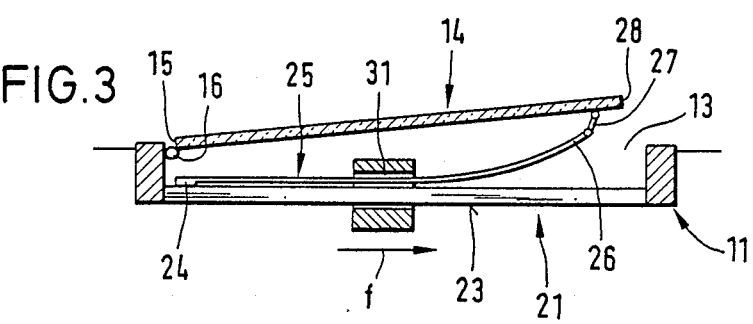
FIG. 3 is a view similar to FIG. 2 showing the assembly in an intermediate position.

From a comparison of FIGS. 2-4, it will be apparent that at the beginning of the closing movement, a given displacement of the slider results in a relatively large displacement of the panel and that, with further displacement of the slider, the displacement of the panel becomes increasingly smaller although the closing force applied to the panel increases.

The displacement ratio between panel and slider thus continuously decreases in the closing direction of movement of the slider.

The embodiment illustrated in FIGS. 5-10 (see also FIG. 11) differs from the embodiment of FIGS. 1-4 in that the hinge 16 is not located on the front limb of the frame but rather on a special bracket 32. As can be seen from FIGS. 7-9, movement of the slider 22 in the closing direction or in the opening direction o will tilt the panel as has been described in connection with FIGS. 1-4. However, in the embodiment of FIGS. 5-10, it is also possible for opening of the panel 14 to shift the bracket 32, e.g. together with the slider 22 in the direction so that the entire system 14, 22, 25, 32 can be displaced opposite the direction a so as not only to tilt the panel but to move its pivoted edge toward the rear of the vehicle.

Figure 9:
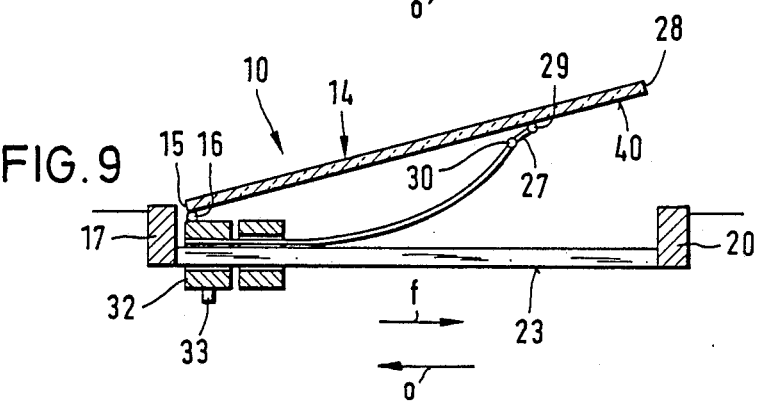
Figure 10:
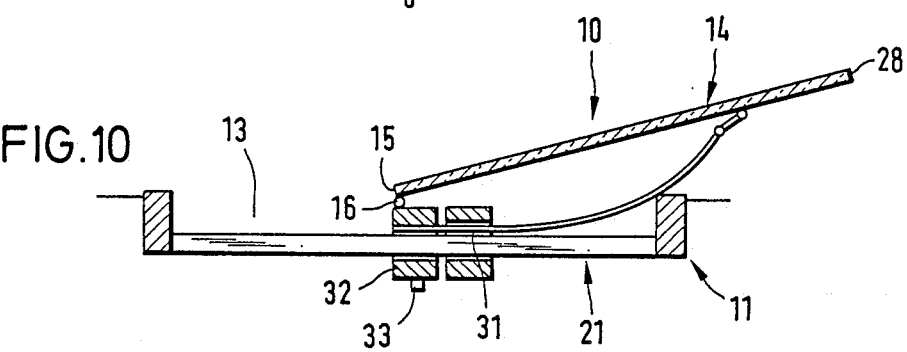

Obviously the panel can be closed by displacing the bracket 32 and the control member 22 in the opposite direction o to return to the position shown in FIG. 9. The bracket 32 can be provided with any conventional means, for example, clamping means like a clamping screw 33 to lock the bracket to connecting strut 23.

It is also possible, in accordance with the present invention, to lock the slider 22 to the guide by means similar to the clamping screw 33.

In FIGS. 11 and 12, I have shown a roof assembly for a roof panel which can be tilted out of the frame opening and which has a kinematic construction similar to the embodiment of FIGS. 5-10. The difference between the embodiment of FIGS. 5-10 and the embodiment of FIGS. 11 and 12, is that the rear end 26 of the leaf spring 25 is bent so as to extend substantially parallel to the flat strip 19 and is received within the housing 34 of a vibration damper 34.

The housing 34 is filled with a permanently elastic pasty synthetic resin 36, i.e. a viscoelastic damping material, which allows some relative movement between the rear end of the leaf spring and the housing for vibration-damping purposes. The synthetic resin or plastic can be a butyl rubber in appropriate consistency.

The rear end 26 of the leaf spring can be provided in addition with a longitudinal slot 37 as shown in broken lines and in which a screw 38 is provided to limit the degree to which this rear end 26 can be withdrawn to the housing. In other words the screw 38 forms a stop preventing an unwanted extraction of the end 26 of the leaf spring from the housing 34 which fully encloses it except at the inlet slot of this housing through which the rear end 26 of the leaf spring extends.

From FIG. 13 it will be apparent that the flat strip 19 is secured to the inner surface 40 of the roof panel 19 by an adhesive layer 41. The flat strip 19 thus simultaneously serves as an obscuration band preventing the connecting strut 23 from being visible from the exterior.

The cutting strut 23 is formed as a trough or channel. The bottom 42 of the trough shaped connecting strut 23 is subdivided into two parts in the longitudinal direction to form a guide slot 43 for the slider 22 in the longitudinal direction.

The slider 22 is formed on its two opposite longitudinal sides with respective guide grooves 44, each of which receives one of the edges 45 defining the guide slot 43 of the strut 23.

At its side extending away from the guide slot 43, the slider passes through a guide slot 46 between two longitudinally subdivided parts of a leaf spring 25. In addition, the hold-down member 48 is connected to the portion of the slider 22 on the opposite side of the leaf spring 25 to engage the broad surface 47 of the latter turned toward the panel 14.

To permit translatory actuation of the slider 22, the latter is provided on its underside with an actuating knob or handle 49.

FIGS. 14 and 15 schematically illustrate an embodiment in which the opening and closing movements of the slider 22 in the direction o and the direction f, respectively, are effected electromechanically.

To this end within the interior 54 of the trough-shaped connecting strut 23, a threaded spindle 50 is rotatably journaled in journal blocks 5 and 52 and thus is retained against axial displacement.

The threaded spindle 50 passes through the slider 22 as has also been diagrammed in broken lines in FIG. 13 and the portion of the slider 22 surrounding the threaded spindle is formed as a nut threadedly engaging this spindle so that, upon rotation of the spindle 50, the slider 22 is displaced therealong and along the strut 23. The spindle is driven by an electric motor 53.

When the spindle drive is a high-efficiency drive unit, a circulating ball-nut arrangement, a ball bearing journaled spindle and a high-pitch spindle which is not self-blocking, the slider can also be displaced by hand as need arises.

Figure 16:
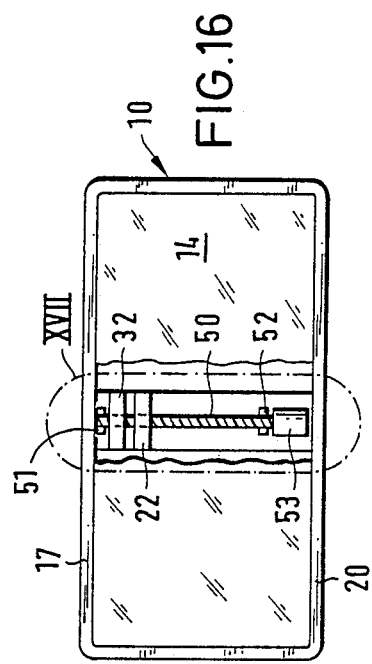
FIG. 16 is a view similar to FIG. 14 illustrating another embodiment of a motor-driven roof assembly.
Figure 17:
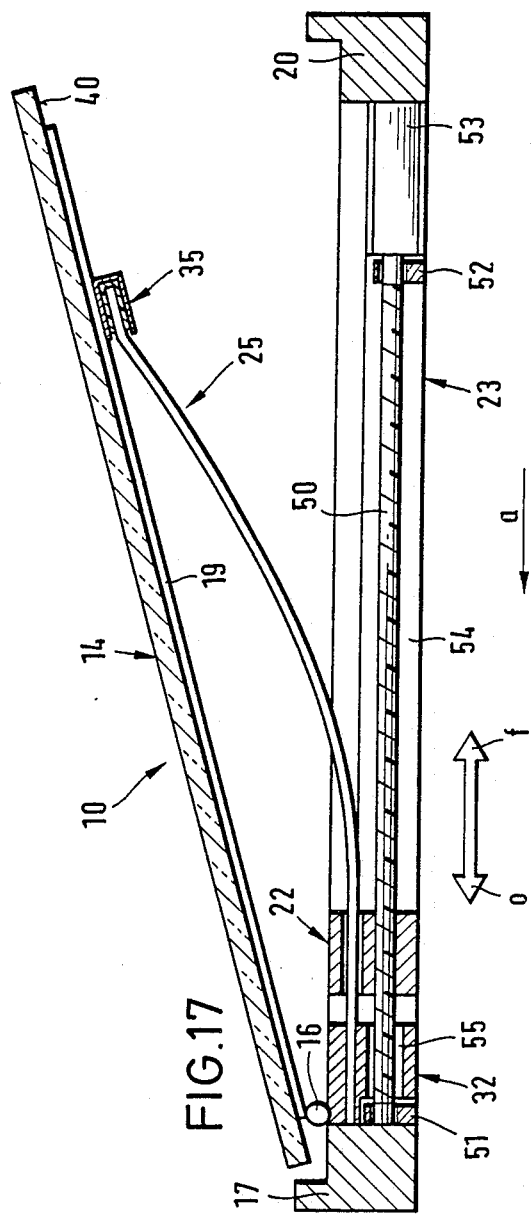
FIG. 17 is a diagrammatic section through the region XVII of FIG. 16 drawn to a larger scale.

The embodiment of FIGS. 16 and 17 differs from the embodiment of FIGS. 14 and 15 in that it also permits shifting of the hinged end of the panel.

In this embodiment, the motor 53 is mounted at the end of the connecting strut 23 opposite the hinge 16. In this embodiment as well, the drive system includes a bearing block 51, the displaceable bracket 32 carrying the hinge 16, the slider 22, the journal block 52 and the electric motor 53.

The threaded spindle 50 passes through an unthreaded (smooth) bore 55 in the slider with all around play. In this manner, the bracket 32, once the panel 14 is opened by a shifting of the slider 22 by the motor in the direction opposite the travel direction a, can be placed to the right, cutting off the drive 50 and the motor 53 or with the motor cut off, to permit the panel to be displaced into position shown in FIG. 10 for example.

In addition, it should be clear that in the embodiment of FIGS. 16 and 17, the bracket 32 can be provided with a clamping element to allow it to be releasably locked to the connecting strut 23 when the slider 22 is to be used exclusively for opening an closing the panel 14 and especially for closing the latter.

FIG. 18 represents a geometrical reversal of the embodiment shown in FIG. 4. In this case, the elastic bent bar 25 extends between the limbs 17 and 20 of the frame while the guide 2 carrying the slider 22 is affixed on the inner surface 40 of the panel 14. Otherwise the reference numerals used in FIG. 18 are analogous to the reference numerals employed in the other FIGURES of the drawing as to the parts involved.

It should also be mentioned that the short link 27 which serves for length compensation, is connected by pivots 29 and 30, respectively, with the limb 20 and spring 25 in this embodiment or a length compensation utilizing the vibration damper 35 can be provided at the end of the leaf spring 26.

I claim:

1. An openable roof assembly for an automotive vehicle, comprising:
    a frame element on a roof of an automotive vehicle defining an opening between exterior and interior of said vehicle;
    a panel element mounted on said frame element and movable between an open position wherein said panel element is tilted out of said opening and a closed position wherein said panel element blocks said opening;
    a hinge member within the perimeter of said frame element pivotally supporting said panel element to enable said panel element to swing between said positions about a pivot axis;
    a rigid elongated substantially rectilinear guide mounted on one of said elements and extending substantially perpendicular to said axis;
    an intrinsically bent elastically straightenable bar braced at one end, extending generally along said guide and operatively connected to said panel element; and
    a control member on said guide and traversed within by said bar and controlling a shape of said bar upon relative displacement of said bar and said control member, at least one of said members being shiftable along said guide so that, upon displacement of said at least one of said members in one direction, constraint on said bar is released and restoring force of said bar upon returning to said bent state displaces said panel member into said open position and, upon displacement of said at least one of said members in an opposite direction along said guide, said bar is elastically straightened by constraint applied by said control member and said panel member is displaced into said closed position.

2. The assembly defined in claim 1 wherein said panel element is a translucent panel of a sun roof of said vehicle.

3. The assembly defined in claim 2 wherein said guide extends between two opposite frame limbs of said frame element and is affixed thereto, said bar having an opposite end articulated to said panel in a tension and compression transmitting manner.

4. The assembly defined in claim 3 wherein said one end of said bar is fixed against displacement relative to said guide.

5. The assembly defined in claim 4, further comprising means retaining said one end of said bar on said guide.

6. The assembly defined in claim 5 wherein said means retaining said one end of said bar is displaceable.

7. The assembly defined in claim 6 wherein said means retaining said one end of said bar is a bracket freely shiftable along said guide.

8. The assembly defined in claim 7 wherein said control member and said bracket are both shiftable along said guide.

9. The assembly defined in claim 2 wherein said control member is a slider mounted o said guide and said bar is received in a sliding channel formed on said slider.

10. The assembly defined in claim 2 wherein said bar is articulated to said panel element at an articulation formed with a length compensation region.

11. The assembly defined in claim 10 wherein said articulation includes a link which is short relative to a length of said bar and has one end connected by a hinge joint to said panel element and another end connected by a hinge joint to said bar.

12. The assembly defined in claim 10 wherein said length compensation region is formed with a vibration damper.

13. The assembly defined in claim 12 wherein said vibration damper is formed with a housing filled with a permanently elastic synthetic resin with a pasty consistency into which said other end of said bar extends as a plunger and surrounding said other end of said bar in said housing.

14. The assembly defined in claim 13 wherein said vibration damper is provided with means for preventing withdrawal of said other end from said housing.

15. The assembly defined in claim 2 wherein said control member is a slider mounted on said guide and said bar is received in a sliding channel formed on said slider, said assembly further comprising a motor operatively connected to said slider for displacing said slider along said guide.

16. The assembly defined in claim 15 wherein said motor is mounted along said guide and has a threaded spindle extending along said guide, traversing said slider and rotated by said motor, said slider being formed as a nut threadedly engaging said spindle and displaced thereby along said guide.

17. The assembly defined in claim 16 wherein said means retaining said one end of said bar is a bracket freely shiftable along said guide, said motor is mounted at an end of said guide proximal to said axis, and said spindle passes through said bracket without entraining same.

18. The assembly defined in claim 17 wherein said guide is formed as a trough and at least one of said bar, said bracket, said slider, said spindle and said motor is received in said trough.

19. The assembly defined in claim 18 wherein said bar is a leaf spring composed of spring steel.

20. The assembly defined in claim 19 wherein said leaf spring comprises two spring parts defining a guide slit for said slider between said parts.

21. The assembly defined in claim 20 wherein said trough has a longitudinal slit through which said slider extends and guiding said slider.

22. The assembly defined in claim 21 wherein said slider has a pair of guide grooves opening on opposite sides of said slider and receiving edges of the longitudinal slit of said trough.

23. The assembly defined in claim 22 wherein said slider above said guide grooves reaches into said slit of said leaf spring, further comprising a hold-down on said slider engaging over said leaf spring.

24. The assembly defined in claim 2, further comprising on an inside of said panel a flat cover strip covering said guide and said bar and adhesively bonded to said panel.

* * * * *